United States Patent [19]

Hallgren et al.

[11] Patent Number: 4,912,172

[45] Date of Patent: Mar. 27, 1990

[54] COMPOSITIONS COMPRISING POLYPHENYLENE ETHERS, POLYEPOXIDES AND ALUMINUM OR ZINC DIKETONE SALT

[75] Inventors: John E. Hallgren, Scotia; Victoria J. Eddy, Schenectady; Jana M. Whalen, Clifton Park, all of N.Y.

[73] Assignee: General Electric Company, Schenectady, N.Y.

[21] Appl. No.: 287,604

[22] Filed: Dec. 22, 1988

Related U.S. Application Data

[63] Continuation of Ser. No. 92,725, Sep. 3, 1987, abandoned, which is a continuation-in-part of Ser. No. 907,426, Sep. 15, 1986, abandoned.

[51] Int. Cl.$^4$ .................. C08K 3/40; C08L 63/02
[52] U.S. Cl. ....................... 525/396; 523/427; 523/428; 523/455; 523/464; 523/447
[58] Field of Search ........................ 525/396

[56] References Cited

U.S. PATENT DOCUMENTS

| | | | |
|---|---|---|---|
| 3,375,298 | 3/1968 | Fox | 525/396 |
| 3,624,032 | 11/1971 | Miyashiro et al. | 525/533 |
| 3,763,088 | 10/1973 | Izawa et al. | 525/396 |
| 3,812,214 | 5/1974 | Markovitz | 525/524 |
| 4,113,791 | 9/1978 | Smith et al. | 525/524 |
| 4,117,361 | 9/1978 | Smith et al. | 525/524 |
| 4,496,695 | 1/1985 | Sugio et al. | 525/391 |

FOREIGN PATENT DOCUMENTS

| | | |
|---|---|---|
| 56167050 | 4/1983 | Japan . |
| 58-84844 | 5/1983 | Japan . |
| 58-225150 | 12/1983 | Japan . |
| 83219217 | 12/1983 | Japan . |

*Primary Examiner*—Allan M. Lieberman
*Assistant Examiner*—Robert E. L. Sellers II
*Attorney, Agent, or Firm*—William H. Pittman; James C. Davis Jr.

[57] ABSTRACT

Blends of high molecular weight polyphenylene ethers with various epoxy materials, particularly polyglycidyl ethers of bisphenolic compounds, are homogeneous at high temperatures and may be cured in the presence of a catalyst such as aluminum tris(acetylacetonate) or zinc bis(acetylacetonate), especially in the additional presence of an accelerator such as a basic nitrogen compound. The cured compositions have advantageous physical and electrical properties and are useful, for example, for the preparation of printed circuit boards.

10 Claims, No Drawings

COMPOSITIONS COMPRISING POLYPHENYLENE ETHERS, POLYEPOXIDES AND ALUMINUM OR ZINC DIKETONE SALT

This application is a continuation of application Ser. No. 92,725, filed Sept. 3, 1987, now abandoned which is a continuation-in-part of application Ser. No. 907,426, filed Sept. 15, 1986, now abandoned.

The present invention relates to melt processable, curable polymer compositions, to methods of curing them and to the cured products prepared thereby, said products having excellent dielectric properties. More particularly, it relates to curable compositions comprising polyphenylene ethers and polyepoxy compounds.

It is known from U.S. Pat. No. 3,356,761 to provide a curable liquid composition of a polyphenylene ether and a vinyl aromatic monomer, such as styrene or vinylpyridine, alone or in further combination with a polyvinyl monomer such as divinylbenzene or a polyunsaturated polyester, and to cure such compositions into shaped articles by heat alone or with a catalyst, such as a peroxide, or by irradiation. Subsequent studies have shown that curing such compositions produces interpenetrating polymer networks in which the polyphenylene ether is dispersed through a network of polymerized vinyl resin. The presence of a polyvinyl component in the composition leads to a crosslinked network with largely the properties which would be anticipated for an ordinary thermoset, with, however, two major advantages. First, the liquid nature of the uncured composition allows it to accept additives which ordinarily do not accommodate themselves to the high processing temperatures required for polyphenylene ethers, alone or in major combination with other resins. Second, the physical and electrical properties ultimately obtained reflect a greater than expected contribution by the polyphenylene ether component.

Many attempts have been made to substitute for the vinyl aromatic component other monomeric and curable components, and, in particular, numerous attempts to substitute epoxy prepolymers have been made. However, the resulting compositions in general have serious deficiencies.

Illustrative prior art disclosures are U.S. Pat. No. 3,763,088, Japanese published application No. 75/5519, and Japanese Kokai Nos. 83/69052, 83/84844 and 83/225150. All of these disclose blends of thermoplastic resins including polyphenylene ethers with polymers or oligomers containing epoxide groups. However, there is no disclosure therein of curing the epoxy compound to provide advantageous properties.

U.S. Pat. No. 4,496,695 discloses curable resin compositions comprising a polyphenylene ether resin, a maleimide component and/or a cyanate ester, and an epoxy compound. These blends alone or in combination with organic catalysts are difficult to cure and result in non-homogeneous materials having poor physical properties.

European patent application Nos. 130,270 and 126,494 describe compositions comprising oligomeric diamine hardeners, epoxy compounds, and optionally, a thermoplastic polymer, such as polyphenylene ether (identified therein as polyphenylene oxide). Such compositions generally cure too rapidly to provide sufficient time for working.

The disclosure of Japanese Kokai No. 83/219217 is particularly relevant. It relates to blends of low number average molecular weight (below 10,000) polyphenylene ethers with epoxy resins, and to cured products prepared therefrom by the action of catalysts, hardeners, etc. The use of a low molecular weight polyphenylene ether can adversely affect the physical properties of the product, but compositions containing higher molecular weight polymers require higher curing temperatures which render it difficult or impossible to control the curing rates.

The state of the art represented by the foregoing publications and patents, therefore, suggests that compositions comprising polyphenylene ethers and epoxides can be made, but they are deficient in at least one important property. For example, they lack homogeneity, they have low ultimate physical properties, low molecular weight limits are necessary, they cure slowly and/or incompletely, electrical properties are less than desirable, and, in at least one case, further resins have to be added to obtain compositions with barely useful properties.

In an attempt to overcome the above-described disadvantages, applicants have tested a number of epoxy compounds for compatibility with high molecular weight polyphenylene ether resins. It has been discovered that blends of polyphenylene ethers and certain polyepoxides, optionally including minor proportions of other epoxy materials, are compatible and are homogeneous at high temperatures, whereas blends with such epoxy compositions as aliphatic epoxy resins, epoxidized vegetable oils and epoxidized phenol novolaks used alone are not. It has also been found that said blends can be advantageously cured by the action of certain metal salts of diketones (e.g., metal acetylacetonates) as catalysts, while conventional epoxy hardeners, e.g., polyanhydrides and polyamines, cause the polyphenylene ether to precipitate.

It has further been discovered that the cured compositions prepared as above are homogeneous resins having high physical strength, excellent electrical properties, and capability of fabrication by such operations as coating, injection molding, pultrusion and resin transfer molding. For many applications, including electrical applications such as the preparation of printed circuit boards, the properties of said cured compositions are equivalent or superior to those of cured epoxy resins typically used for the same purposes.

In one of its aspects, the invention includes compositions which are capable of being controllably cured upon contact with an aluminum tris(acetylacetonate) or zinc bis(acetylacetonate) catalyst at a temperature in the range from about 150° C. to just below its decomposition temperature, and which are homogeneous and melt processable at a temperature in said range in the absence of fillers and solvents; said compositions consisting essentially of:

(A) at least one polyphenylene ether having a number average molecular weight of at least about 12,000, and (B) an epoxy material selected from the group consisting of (B-1) at least one polyglycidyl ether of a bisphenolic compound, said polyglycidyl ether having an average of at most one aliphatic hydroxy group per molecule, and combinations of a major amount of said polyglycidyl ether with a minor amount of at least one of (B-2) aryl monoglycidyl ethers and (B-3) non-bisphenolic polyepoxy compounds;

and said compositions comprising up to about 90% by weight of component A, based on components A and B. Said compositions are hereinafter sometimes designated "potentially curable compositions".

The polyphenylene ethers (also known as polyphenylene oxides) used as component A in the present invention are a well known class of polymers. They are widely used in industry, especially as engineering plastics in applications requiring toughness and heat resistance.

The polyphenylene ethers comprise a plurality of structural units having the formula

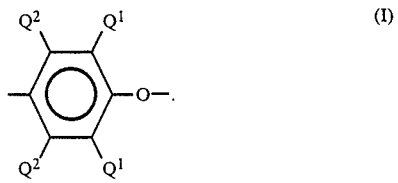

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such non-hydroxy-containing vinyl monomers as acrylonitrile and vinylaromatic compounds (e.g., styrene), or such non-hydroxy-containing polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

For the purposes of this invention, the polyphenylene ether has a number average molecular weight within the range of about 12,000–40,000, preferably about 15,000–40,000, and a weight average molecular weight within the range of about 25,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,036,874, 3,306,875, 3,914,266 and 4,028,341. They usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

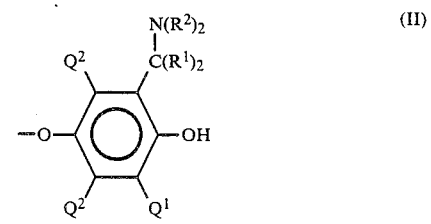

and

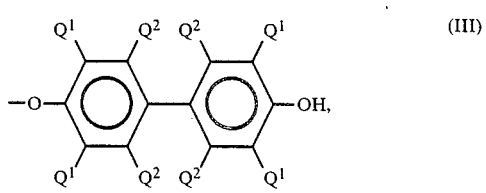

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

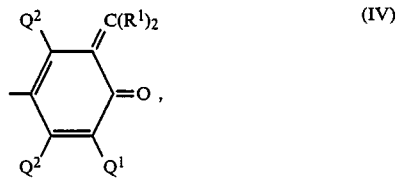

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula III are typically obtained from reaction mixtures in which a by-product diphenoquinone of the formula

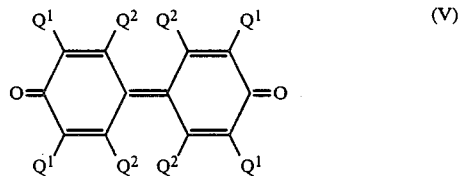

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

Component B is an epoxy compound or a mixture of epoxy compounds, of which an essential ingredient is (B-1) at least one polyglycidyl ether of a bisphenolic compound. The diglycidyl ethers are preferred; they may be conventionally prepared by the reaction of epichlorohydrin with bisphenols, the latter typically having the formula $$HO-A^1-Y-A^2-OH \qquad (VI)$$

wherein each of $A^1$ and $A^2$ is a monocyclic divalent aromatic radical and Y is a bridging radical in which one or two atoms separate $A^1$ from $A^2$. The free valence bonds in formula VI are usually in the meta or para positions of $A^1$ and $A^2$ in relation to Y.

In formula VI, the $A^1$ and $A^2$ values may be unsubstituted phenylene or substituted derivatives thereof, illustrative substituents (one or more) being alkyl, halo (especially chloro and/or bromo), nitro, alkoxy and the like. Unsubstituted phenylene radicals are preferred. Both $A^1$ and $A^2$ are preferably p-phenylene, although both may be o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, ethylene, isopropylidene, neopentylidene, cyclohexylidene or cyclopentadecylidene, especially a gem-alkylene (alkylidene) radical and most preferably isopropylidene. Also included, however, are radicals which contain atoms other than carbon and hydrogen; for example, carbonyl, oxy, thio, sulfoxy and sulfone.

The reaction of epichlorohydrin with bisphenols of formula VI typically produces diglycidyl ethers of the formula

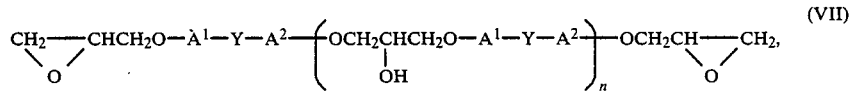

wherein n may have an average value from 0 to about 15. The present invention contemplates the use of ethers containing an average of at most one aliphatic hydroxy group per molecule; that is, the average value of n is up to 1. Commercially available materials of this type, derived from 2,2-bis(4-hydroxyphenyl)propane (bisphenol A), include EPON 825 (n=0) and EPON 828 (n=about 0.14), available from Shell Chemical Co.

Also useful as component B-1 are bisphenolic epoxy novolaks. These are compounds of the type which may be prepared by reaction of a bisphenol of formula VI with formaldehyde followed by formation of the polyglycidyl ether.

Component B usually consists essentially of the above-described component B-1. However, it may include minor proportions of other epoxy compounds. These include (B-2) aryl monoglycidyl ethers such as the phenyl, α-naphthyl and β-naphthyl ethers and substituted derivatives thereof, the substituents being similar to those previously described for the diglycidyl ethers.

Also included are (B-3) non-bisphenolic polyepoxy compounds. Numerous compounds of this type are known in the art, and all are contemplated for use herein. They are illustrated by alicyclic polyepoxy compounds such as 3,4-epoxycyclohexylmethyl 3,4-epoxycyclohexanecarboxylate, vinylcyclohexene dioxide, phenol-formaldehyde novolak polyglycidyl ethers, resorcinol glycidyl ether, tetrakis(glycidyloxyphenyl)ethane, diglycidyl phthalate, diglycidyl tetrahydrophthalate and diglycidyl hexahydrophthalate.

For the most part, component B will contain a total of no more than about 30% by weight of components B-2 and/or B-3, if any. The mixture of components A and B typically contains component A in proportions in the range of 5–90% by weight, with about 30–85% and particularly about 60–80% being preferred.

An essential feature of the potentially curable compositions of the invention is their homogeneity at temperatures in the range from about 150° C. to just below their decomposition temperature. That is, when heated to temperatures above 150° C. and especially in the range of about 200°–225° C., said compositions form a single viscous liquid phase which is readily melt processable.

At lower temperatures, the potentially curable compositions may become opaque by reason of separation into two phases. One is a solid polyphenylene ether phase, and the other is a polyepoxide-plasticized polyphenylene ether phase which, at high polyepoxide concentrations, becomes a solution of polyphenylene ether in polyepoxide. Under conditions of high polyphenylene ether concentration, a combination of the composition with filler or reinforcing medium, and optionally with curing catalyst, may be handled as a prepreg and has a characteristic "leathery" feel.

A further feature is the absence of other components which contribute materially to the essential properties of the composition. While solvents, fillers and reinforcing media, and other inert adjuvants may be present as described hereinafter, unspecified reactive materials are absent. It is apparent, therefore, that these compositions do not contain epoxy hardeners as that term is ordinarily understood; that is, compound such as diamines which react stoichiometrically with epoxy compounds.

The potentially curable compositions are still further characterized by the capability of being controllably cured upon contact with an aluminum tris(acetylacetonate) or zinc bis(acetylacetonate) catalyst at a temperature in the above-described range. For actual use in curing, a somewhat broader genus of catalysts is contemplated. These include the aluminum and zinc salts of diketones of the formula

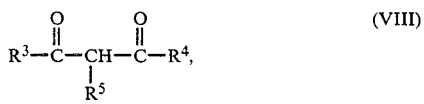

(VIII)

wherein each of $R^3$ and $R^4$ is $C_{1-20}$ alkyl or aryl and $R^5$ is hydrogen or $C_{1-20}$ alkyl or aryl. Most often, $R^3$ and $R^4$ are each methyl and $R^5$ is hydrogen. Thus, the preferred salts are the aforementioned aluminum tris(acetylacetonate) and zinc bis(acetylacetonate). The zinc salt generally achieves improved flame retardancy and chemical resistance. Another aspect of the invention is compositions (hereinafter sometimes designated "curable compositions") consisting essentially of components A and B as previously described and (C) an effective amount of a curing catalyst comprising an aluminum or zinc salt of a diketone of formula VIII.

For certain operations such as casting, it is frequently possible to employ component C in the absence of accelerators. However, it is within the scope of the invention to incorporate (D) at least one curing accelerator in the curable composition, and such incorporation is frequently preferred since it permits curing to be completed in a relatively short time under the conditions disclosed hereinafter.

Many curing accelerators are known in the art and may be employed as component D. They include phenolic compounds such as bisphenol A, pyrogallol, dihydroxydiphenyls, hydroxybenzaldehydes such as salicylaldehyde, catechol, resorcinol, hydroquinone, phenol-formaldehyde or resorcinol-formaldehyde condensates and halogenated phenols.

Also useful, and usually preferred, as component D are basic nitrogen compounds, particularly amines and guanidines. Their precise identity is not critical, provided they have sufficiently low volatility to remain present and active in the composition during the curing operation. Particularly effective are $C_{4-10}$ alkylamines such as di-n-butylamine, tri-n-butylamine and 2-ethylhexylamine, and tetraalkylguanidines such as tetramethylguanidine which are generally preferred. Polyphenylene ethers containing aminoalkyl-substituted end groups of formula II, and to some extent the free amines generated thereby in the formation of quinone methide-type intermediates of formula IV, may also act as accelerators. Thus, another aspect of the invention is curable compositions consisting essentially of components A, B, C and D.

The curable compositions of this invention typically contain the curing catalyst (component C) in small quantities, ordinarily about 0.5–10.0% and preferably about 1–5% based on the total of components A and B. It is important to note that these catalysts do not in a significant way become chemically incorporated in the cured composition as do the previously mentioned hardeners and similar curing agents added in much larger amounts, typically near stoichiometric.

When an accelerator is present, it is ordinarily utilized in an amount to provide about 1000–1500 ppm., based on components A, B, C and D, of basic, non-volatilized nitrogen. The amount of component D added will therefore be adjusted downward to compensate for the basic nitrogen, if any, present in the polyphenylene ether, which is usually in the range of about 200–1000 ppm., and upward to compensate for volatilization. Balancing these factors, an amount of component D to provide about 1500–2500 ppm. of basic nitrogen is usually appropriate.

The curable compositions of this invention are capable of being processed and cured by various methods, and the morphology of the cured product depends to some extent on the method employed. All of said methods, however, involve maintaining said composition at its curing temperature for a time sufficient to effect cure thereof, and this general method of curing, as well as the cured compositions prepared thereby, are still other aspects of the invention. As previously noted, typical curing temperatures are in the range from about 150° C. to just below decomposition temperature, and especially about 200°–225° C. Curing times may vary from about 5 minutes to about 1 hour, with times longer than about 30 minutes generally not being necessary when accelerators are employed.

In one processing method, particularly suitable in connection with such operations as pultrusion, casting and resin transfer molding and particularly with compositions comprising up to about 50% of component A, the potentially curable composition or a combination thereof with curing catalyst and, optionally, accelerator is melt blended under conventional conditions. A viscous homogeneous mixture is formed which undergoes curing when an effective temperature therefor is attained. If the time required for processing exceeds the curing time, the catalyst or accelerator may be added at a later stage.

Two different solution processing techniques may be employed, depending on the boiling point of the solvent and the effective curing temperature of the curable composition. In the first method, a relatively high boiling solvent such as toluene is employed and remains in contact with the curable composition as curing is initiated. This method is particularly useful for the preparation of such articles as glass cloth-reinforced prepregs by dipping in or spraying with the solution. Such prepregs are useful, for example, in the preparation of copper-clad printed circuit boards by lamination. When this method is employed, curing takes place in a homogeneous medium.

A second solution method involves the use of a relatively low boiling solvent, such as chloroform, to facilitate blending of the resinous components, catalysts and, optionally, accelerator. Upon stripping of the solvent, a heterogeneous solid mixture is obtained which, as previously noted, includes solid polyphenylene ether and polyepoxide-plasticized polyphenylene ether. During the heating of this mixture to curing temperatures, the curing reaction competes with further dissolution of polyphenylene ether in the polyepoxide. The result is a two-phase cured system which, particularly when a high proportion of component A is employed, comprises a cured epoxide discontinuous phase surrounded by a polyphenylene ether continuous phase. Such systems are useful, for example, in compression molding.

It should be noted that not all of the curing methods described hereinabove directly utilize the homogeneous property of the potentially curable compositions of the invention. Nevertheless, this property is an important feature of said compositions and contributes in various ways to the desirable properties of the cured compositions prepared therefrom.

Regardless of which processing method is used, the cured compositions of the invention are typically in the nature of interpenetrating polymer networks having a crosslinked thermoset phase and non-crosslinked thermoplastic phase. When analyzed by dynamic mechanical analysis (DMA), they frequently display two discrete glass transition temperatures (Tg), the lower one attributable to the cured polyepoxide and the higher one to the polyphenylene ether. Differential scanning calorimetry (DSC), however, generally detects only one Tg, generally higher than the values detected by DMA. Cured compositions in which component B is a bisphenol A compound are transparent, since the two phases have identical refractive indices.

The physical and electrical properties of said cured compositions are, in general, comparable or superior to those of cured polyepoxides used commercially for the manufacture of printed circuit boards. For example, a mixture of 80% (by weight) polyphenylene ether and 20% bisphenol A diglycidyl ether, upon curing in the presence of an aluminum tris(acetylacetonate) catalyst, yields a composition whose dielectric constant, flammability, water absorption and peel strength properties are comparable to those of said cured polyepoxides. Thermal expansion values below and above glass transition temperature are similarly comparable; however, the cured compositions of this invention are superior in this respect in having a Tg on the order of 80° C. higher than that of the cured polyepoxide, permitting greater freedom of processing, as well as being non-dusting and having an extremely smooth surface.

When compared to those of other known polyphenylene ether-polyepoxide compositions, the properties of those of this invention are superior in many respects. These may include physical properties, electrical properties and conditions of fabrication and curing. By reason of said superior properties in the nature of fabrication conditions, options for laminate production include continuous fabrication with curing times on the order of one minute.

The precise chemical nature of the above-described cured compositions is not known with certainty, although curing of the epoxy compound probably takes place conventionally, at least in part. It is believed that the polyphenylene ether participates, at least to some extent, in the curing reaction.

The curable and potentially curable compositions of this invention may also contain such conventional materials as flame retardants (e.g., hydrated alumina, decabromodiphenyl ether), fillers and reinforcing media (e.g., glass fiber, polyester fiber, polypropylene fiber, cellulosics, nylon, acrylics), antioxidants, thermal and ultraviolet stabilizers, lubricants, anti-static agents, dyes, pigments and the like, all in conventional proportions. Any fillers present in the potentially curable compositions will, of course, render them non-homogeneous at the aforementioned temperatures, though they would be homogeneous at said temperatures in the absence thereof.

The invention is illustrated by the following examples. All parts and percentages are by weight unless otherwise indicated. The polyphenylene ether used in each example was a poly(2,6-dimethyl-1,4-phenylene ether) having, unless otherwise indicated, a number average molecular weight of about 20,000 and an intrinsic viscosity (IV) in chloroform at 25° C. of 0.52 dl./g., and a nitrogen content of about 960 ppm.

EXAMPLES 1–4

A series of compositions was prepared by the following procedure: A 100 ml. beaker equipped with a magnetic spin bar was charged with 30.0 g of bisphenol A diglycidyl ether and heated at temperatures in the range of 180°–200° C. Polyphenylene ether was added slowly, with stirring. After all of the polyphenylene oxide had dissolved, 2% aluminum tris(acetylacetonate), based on total polyphenylene ether and polyepoxy compound, was added. The mixture was stirred to effectuate solution, poured into a cavity mold that was preheated to 160° C., then baked at 180° C. for 2 hours to effect cure.

Determinations of tensile strength and elongation values and heat distortion temperature were carried out by methods similar to ASTM procedures. The compositions used and the results obtained are set forth in Table I.

TABLE I

| Example | 1 | 2 | 3 | 4 |
|---|---|---|---|---|
| Polyphenylene ether, parts | 10 | 20 | 25 | 33 |
| Bisphenol A diglycidyl ether, parts | 90 | 80 | 75 | 67 |
| Tensile strength at break, MPa. | 41.4 | 60.7 | 68.9 | 75.8 |

TABLE I-continued

| Example | 1 | 2 | 3 | 4 |
|---|---|---|---|---|
| Elongation, % | 6.4 | 12.8 | 15.0 | 17.5 |
| Heat distortion temperature, °C. at 1.8 MPA. | 174 | 190 | 190 | 190 |

The foregoing results indicate that the toughness of the compositions, as exemplified by tensile strength values, increase in a nearly linear fashion from 41.4 MPa. for 10% polyphenylene ether to more than 75 MPa. for 33% polyphenylene ether. Heat distortion temperature values are substantially constant at polyphenylene ether levels above 20%. Similar results were obtained for compositions containing up to 50% polyphenylene ether.

EXAMPLES 5-7

Compositions were prepared and tested by the procedure of Examples 1-4, employing 25% by weight of polyphenylene ethers of differing intrinsic viscosities (IV) and 75% bisphenol A diglycidyl ether. The results obtained are set forth in Table II.

TABLE II

| Example | 5 | 6 | 7 |
|---|---|---|---|
| Polyphenylene ether intrinsic viscosity, dl./g. | 0.24 | 0.44 | 0.51 |
| Tensile strength at break, MPa. | 4.8 | 57.9 | 60.7 |
| Elongation, % | 9.3 | 8.3 | 14.5 |
| Heat distortion temperature, °C. at 1.8 MPa. | 170 | 194 | 190 |

The foregoing results indicate that the viscosities of the uncured solutions vary markedly with the IV of the polyphenylene ether, with solutions containing 0.24 dl./g. IV polyphenylene ether being less than one-fifth as viscous as those containing 0.51 dl./g. IV polyphenylene ether. Heat distortion temperature values vary little with the intrinsic viscosity of the polyphenylene ether, but larger differences were noted in elongation. High molecular weight polyphenylene ether evidently provides better reinforcing of the cured matrix.

EXAMPLE 8

Flame retardant compositions are prepared by following the general procedure of Examples 1-4 and including flame retardant amounts of hydrated alumina in the uncured blend.

EXAMPLES 9-18

Solutions were prepared by dissolving 300 grams of a combination of polyphenylene ether and bisphenol A diglycidyl ether in about 1 liter of chloroform, adding a curing catalyst and, in Examples 11-13 and 15-18, 2000 ppm. (based on components A, B, C and D) of a nitrogen base as an accelerator. The chloroform was removed under reduced pressure and the resulting solid blends were vacuum dried and ground to powder. The powders were them compression molded for 1 hour at various temperatures to form plaques, 15.25×15.25×0.32 cm. The glass transition temperatures of the plaques were determined using DMA.

The relevant parameters and results are given in Table III. Proportions of component C are percentages based on the total of components A and B.

TABLE III

| Example | Ratio, A:B | Catalyst Metal | Catalyst Percent | Accelerator* | Curing temp., °C. | Tg, °C. |
|---|---|---|---|---|---|---|
| 9 | 50:50 | Al | 1 | — | 230 | 50 |
| 10 | 50:50 | Al | 5 | — | 230 | 83,149 |
| 11 | 50:50 | Al | 5 | TMG | 240 | 214 |
| 12 | 50:50 | Al | 5 | DBA | 230 | 107,195 |
| 13 | 67:33 | Al | 3.3 | TMG | 240 | 192,209 |
| 14 | 70:30 | Al | 0.6 | — | 230 | 80 |
| 15 | 70:30 | Al | 3 | DBA | 230 | 113,189 |
| 16 | 70:30 | Zn | 3 | TMG | 240 | 117,186 |
| 17 | 80:20 | Al | 2 | TMG | 240 | 192,211 |
| 18 | 90:10 | Al | 1 | TMG | 240 | 188,206 |

*DBA - di-n-butylamine; TMG - tetramethylguanidine

These examples show that under the molding conditions employed, curing is not complete in the absence of accelerators. When accelerators are employed, two different glass transition temperatures are frequently detected by TMA. When determined by DSC, however, only the higher glass transition temperature is ordinarily detected and it is usually several degrees higher than those listed in Table III.

EXAMPLE 19

Following the procedure of Examples 9-18, compositions were prepared containing 210 grams of polyphenylene ether, 69 grams of bisphenol A diglycidyl ether, 21 grams of a polyglycidyl ether of a bisphenol A novolak resin, 9 grams of aluminum tris(acetylacetonate) and 1.65 grams of tetramethylguanidine. Upon molding, a plaque was produced which showed glass transition temperatures (TMA) of 139° and 220° C.

EXAMPLE 20

Following the procedure of Examples 9-18, compositions were prepared containing 150 grams of polyphenylene ether, 45 grams of bisphenol A diglycidyl ether, 105 grams of a commercially available diglycidyl ether of a cresol novolak resin, 15 grams of aluminum tris(acetylacetonate) and 1.65 grams of tetramethylguanidine. Upon molding, a plaque was produced which showed glass transition temperatures (TMA) of 157° and 216° C.

EXAMPLE 21

A solution of 70 parts of polyphenylene ether in 280 parts of toluene was prepared by gentle heating at about 80° C., after which there were added 30 parts of bisphenol A diglycidyl ether, 3 parts of aluminum tris(acetylacetonate) and 0.57 part of tetramethylguanidine. Prepreg composites were prepared by dipping swatches of fiberglass cloth into the warm solution and air drying at about 170° C. Laminates were prepared from two of such composites and cured by compression molding for 1 hour at 240° C. The cured product had a tensile strength of 96.5 MPa., a flexural strength of 137.9 MPa. and a flexural modulus of 3.4 GPa.

EXAMPLES 22-23

Following the procedure of Example 21, toluene solutions were prepared in which the proportions of polyphenylene ether and bisphenol A diglycidyl ether were varied, and were used in the formation of prepreg composites and laminates which were then cured. Various physical and electrical parameters were determined on the cured products. The relevant parameters and results are given in Table IV.

TABLE IV

| | Example | |
|---|---|---|
| | 22 | 23 |
| Weight ratio, A:B | 50:50 | 80:20 |
| Water absorption, % | 0.30 | 0.15 |
| Solder resistance, sec. to blister: | | |
| 260° C. | 185 | 51 |
| 288° C. | 17 | 6 |
| Dielectric constant: | | |
| Initial | 3.90 | 3.74 |
| After solder contact, 10 sec. at 288° C. | 4.03 | 3.81 |
| Dissipation factor at 1 MHz: | | |
| Initial | 0.0140 | 0.0077 |
| After solder contact, 10 sec. at 288° C. | 0.0190 | 0.0120 |
| Perpendicular dielectric breakdown strength, volts: | | |
| Initial | 1316 | 1486 |
| After solder contact, 10 sec. at 288° C. | 1242 | 931 |
| Peel strength: | | |
| Initial | 10.0 | 11.8 |
| After solder contact, 10 sec. at 288° C. | 9.6 | 10.6 |
| Glass transition temp., °C.: | | |
| DMA | 136,201 | 197 |
| DSC | 214 | 210 |

What is claimed is:

1. A curable composition consisting essentially of:
   (A) at least one polyphenylene ether having a number average molecular weight of at least about 12,000 to about 40,000, and
   (B) an epoxy material selected from the group consisting of (B-1) at least one polyglycidyl ether of a bisphenolic compound, said polyglycidyl ether having an average of at most one aliphatic hydroxy group per molecule, and combinations of a major amount of said polyglycidyl ether with a minor amount of at least one of (B-2) aryl monoglycidyl ethers and (B-3) non-bisphenolic polyepoxy compounds; and
   (C) an effective amount of a curing catalyst comprising an aluminum or zinc salt of a diketone of the formula

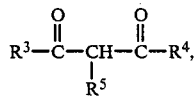 (VIII)

wherein each of $R^3$ and $R^4$ is $C_{1-20}$ alkyl or aryl and $R^5$ is hydrogen or $C_{1-20}$ alkyl or aryl;

said composition comprising from 5 up to about 90% by weight of component A, based on components A and B, and having no other reactive materials.

2. A composition according to claim 1 wherein $R^3$ and $R^4$ are each methyl, $R^5$ is hydrogen and component A is a poly(2,6-dimethyl-1,4-phenylene ether).

3. A composition according to claim 2 wherein component C is aluminum tris(acetylacetonate) or zinc bis(acetylacetonate).

4. A composition according to claim 2 wherein the catalyst is present in amounts in the range of about 0.5–10% based on the total of components A and B.

5. A prepreg composition comprising a composition according to claim 2 and at least one filler.

6. A prepreg composition according to claim 5 wherein the filler is glass fiber.

7. A curable composition consisting essentially of:
   (A) at least one polyphenylene ether having a number average molecular weight of at least about 12,000 to about 40,000;
   (B) an epoxy material selected from the group consisting of (B-1) at least one polyglycidyl ether having an average of at most one aliphatic hydroxy group per molecule and combinations of a major amount of said polyglycidyl ether with a minor amount of at least one of (B-2) aryl monoglycidyl ethers and (B-3) non-bisphenolic polyepoxy compounds;
   (C) an effective amount of a curing catalyst comprising an aluminum or zinc salt of a diketone of the formula

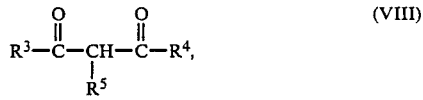 (VIII)

wherein each of $R^3$ and $R^4$ is $C_{1-20}$ alkyl or aryl and $R^5$ is hydrogen or $C_{1-20}$ alkyl or aryl; and
   (D) at least one phenolic compound or basic nitrogen compound as a curing accelerator;
said composition comprising from 5 up to about 90% by weight of component A based on components A and B, and having no other reactive materials.

8. A composition according to claim 7 wherein component D is a basic nitrogen compound and is present in an amount to provide about 1000–1500 ppm., based on components A, B, C and D, of basic, non-volatilized nitrogen.

9. A composition according to claim 7 wherein component D is tetramethylguanidine and is present in the amount of about 1500–2500 ppm., based on components A, B, C and D.

10. A cured composition prepared by the method of claim 9.

* * * * *